United States Patent

Litchford

[15] 3,696,418
[45] Oct. 3, 1972

[54] ALTITUDE MEASURING SYSTEM

[72] Inventor: George B. Litchford, Northport, N.Y.

[73] Assignee: The United States of America as represented by the Administrator of the National Aeronautics and Space Administration

[22] Filed: Sept. 14, 1970

[21] Appl. No.: 72,024

[52] U.S. Cl.............343/11 R, 343/5 DP, 343/11 VB
[51] Int. Cl................................................G01s 9/04
[58] Field of Search...............343/5 DP, 11 R, 11 VB

[56] References Cited

UNITED STATES PATENTS 3,337,869   8/1967   Bernstein et al.............343/11

*Primary Examiner*—T. H. Tubbesing
*Attorney*—Edward K. Tin, Marvin F. Matthews and John R. Manning

[57] ABSTRACT

A surface based altitude measuring system for accurately measuring the altitude of an airborne vehicle consisting in part of two antennas for producing narrow fan beams which intersect in space, so that the altitude of an aircraft which flies through the two beams can be accurately determined. The radar echo which returns from the aircraft determines the slant range of the aircraft from the antennas, and the time interval between the interceptions of the two beams by the aircraft is related to the elevation angle. The true height of the aircraft above the antennas is determined from the above measurements, with compensation for flight paths not directly above the facility.

4 Claims, 10 Drawing Figures

INVENTOR.
GEORGE P. LITCHFORD

BY

ATTORNEY

INVENTOR.
GEORGE P. LITCHFORD
BY Allison C. Collard
ATTORNEY

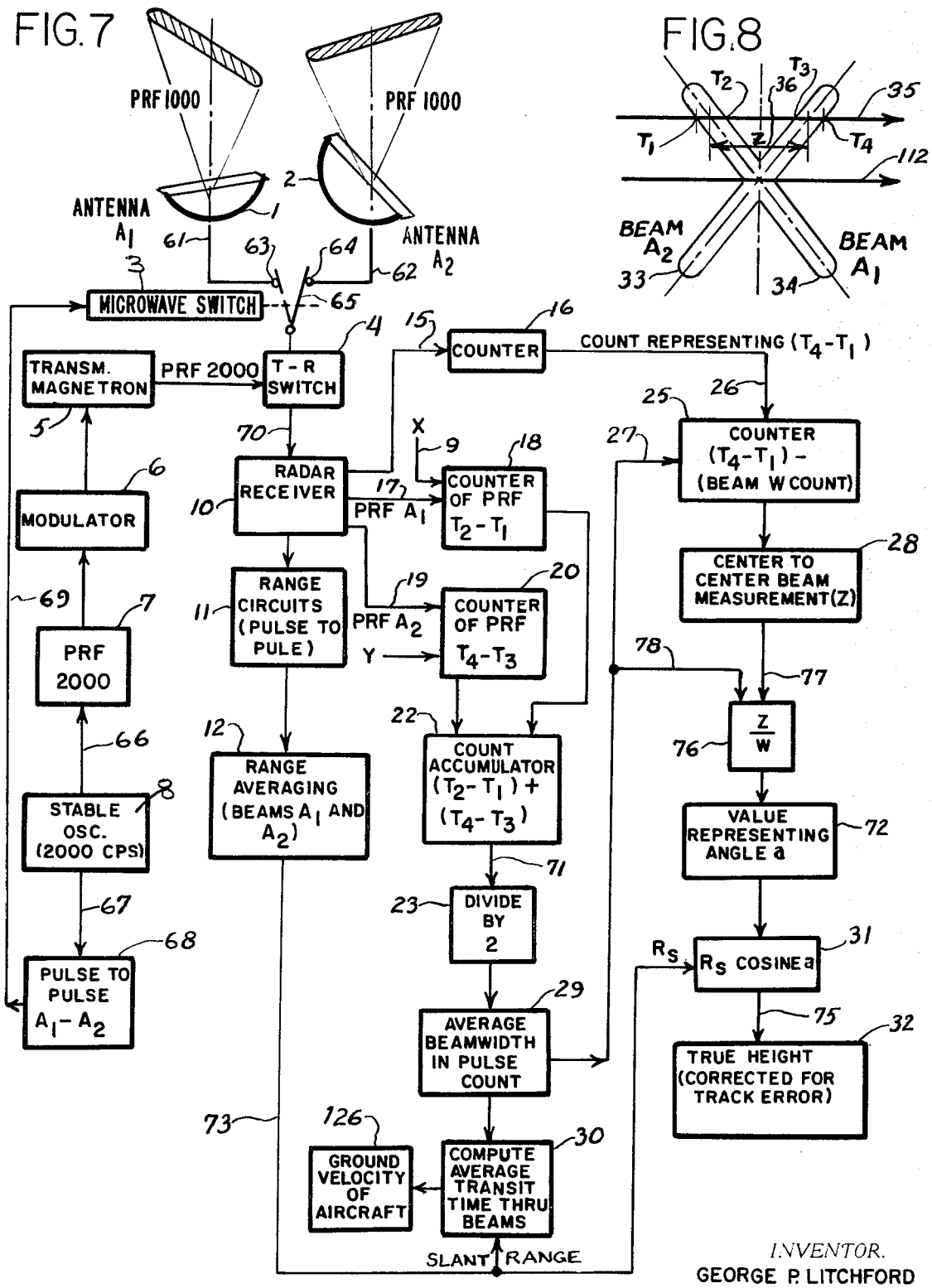

ALTITUDE MEASURING SYSTEM

The invention relates to an altitude measuring system for accurately determining the true altitude of an aircraft and other airborne vehicles above the land surface.

The invention described herein was made in the performance of work under a NASA contract and is subject to the provisions of Section 305 of the National Aeronautics and Space act of 1958, Public Law 85—568 (72 Stat. 435; 42 U.S.C. 2457).

More specifically, this invention relates to an electronic altitude measuring system which utilizes a pair of intersecting radar beams which determines the distance of the aircraft from the radar antennas by both measuring the radar range and the elevation angle of the aircraft.

Airborne vehicles, and particularly self-propelled aircraft, include some means for measuring the altitude of the vehicle while it is in flight. Most aircraft carry altimeters which utilize the relative air pressure for determining altitude while the aircraft is in flight.

These devices are subject to various in flight errors, which can accumulate to nearly a 1000 feet. The effects of localized atmospheric pressure changes can be partially corrected by a pilot using surface barometric information transmitted by voice radio communications from the ground. This method of correction does not account for anomalous pressure gradients, instrumental errors, or human errors. These errors can be quite different in two aircraft that are in proximity, resulting in an actual vertical separation substantially less than the separation indicated by the respective altimeter readings.

Several conventional devices exist for reporting barometrically sensed altitude above the surface. The most common conventional apparatus is airborne transponder that automatically transmits to a SECONDARY SURVEILLANCE RADAR (SSR) a coded message corresponding to the aircraft's barometric height. Over 4,000 codes permit altitude data transmission from air to ground in 100 foot increments. It, therefore, becomes advantageous to find an independent altitude measuring system suitable for checking the airborne sensors supplying the altitude data to the transponders.

Accordingly, the present invention overcomes the disadvantages of conventional altitude measuring systems by providing a ground based system, employing two beam radars which generate intersecting fan beams. The cross-beam radars are preferably located near a landing area where approaching or departing aircraft would customarily be travelling at low altitudes. Prior to landing, an aircraft may fly through the intersecting beams in order to obtain an accurate altitude measurement before making a landing at descent terminating in a nearby runway. When the aircraft intersects one or both of the fan beams, its range with respect to the antennas can be measured by conventional radar ranging techniques. The detection of the aircraft also starts counter means which measures the time interval from the instant when the aircraft intercepts the first of the fan beams until it emerges from the second arm of the intersecting fan beams, and also measures the intervals during which the aircraft is within the beams. By combining these measured time intervals with the range of the aircraft, it is possible to accurately determine the vertical or true height of the aircraft above the ground surface. This information can be immediately determined after the aircraft emerges from the cross-beam radars and relayed to the pilot so that he can make a corresponding adjustment to his barometric altimeter.

In the drawings, wherein similar reference characters denote similar elements throughout the several views:

FIG. 1 is a cross-sectional view partly in diagrammatic form of the geometric configuration for altitude measurement;

FIGS. 2A, 2B and 2C disclose intersecting fan beam radar patterns for several different aircraft flight paths according to the invention;

FIG. 7 is an electrical block diagram of the circuitry employed to obtain the true height measurement; and FIG. 8 is a diagram illustrating the antenna pattern formed by the intersecting fan beams.

Figure 1:
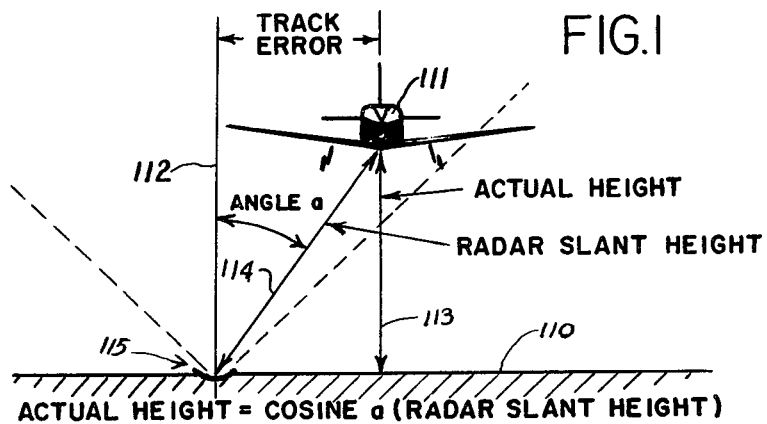

Referring to FIG. 1, there is shown a cross-sectional view in partly diagrammatic form of an aircraft 111 passing adjacent to antennas 115 over ground region 110. The actual height 113 is equal to the radar slant height 114 multiplied by the cosine of angle $a$ which is the angle of departure of the aircraft from a vertical line 112 directly over antennas 115. The angle $a$ is hereinafter referred to as the zenith angle.

Figure 2A:
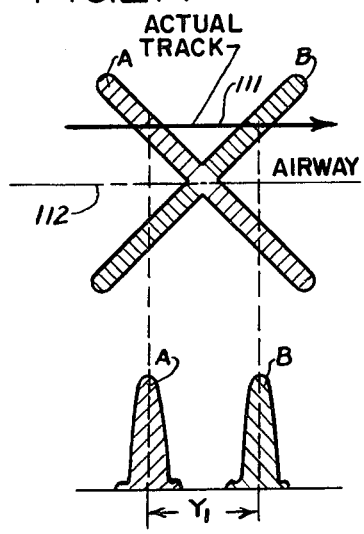
Figure 2B:
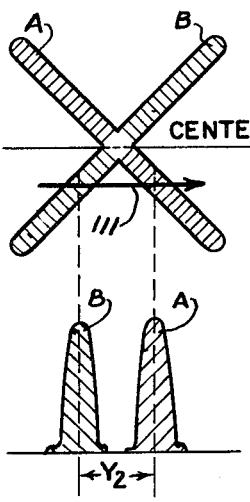
Figure 2C:
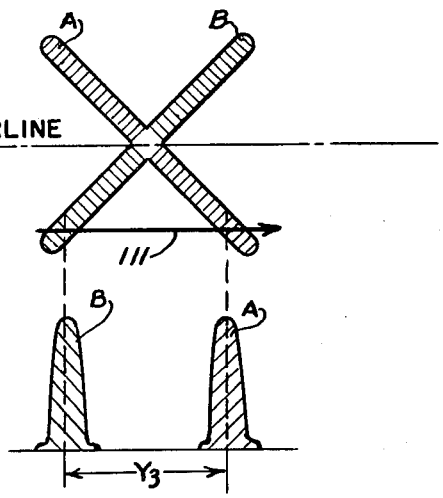

FIGS. 2A, 2B and 2C are a top plan view of the intersecting beams showing various paths of aircraft 111 with respect to cross-beam antenna patterns A and B.

FIGS. 2A, 2B and 2C also show the time differences $Y_1$, $Y_2$, and $Y_3$, for three conditions of flight track error for aircraft 111. Since the aircraft speed, cross track error and height are variable, it is possible to automatically compensate for these variables during the measurement of angle $a$ by the measurement of the time Y between the interception of each vertical beam. The pulse repetition frequency (PRF) of the transmitting radar is constant so that the time within each beam, and between beams, can be related to the number of pulses received on the ground from each beam. Thus, the number of pulses in the known beam width produced by the antenna establishes the speed of the aircraft along with the slant radar range 114. Angle $a$ can thus be determined in order to correct slant range 114 to read the true vertical height 113 of aircraft 111.

Figure 3:
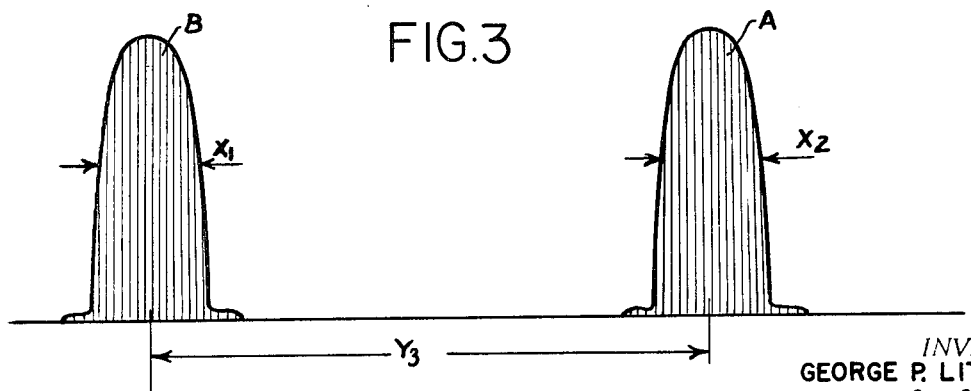
FIG. 3 is a diagrammatic representation of the pulses produced by the electronic equipment used to track the aircraft through the fan beams.

The basic radar system utilizes two cross-beam radars having flat planar beams that are very narrow in one dimension and quite wide in the other. Each antenna can be fed from the same radar, or the radar can be rapidly and alternately switched to each antenna with a slightly different PRF in order to identify from the return signal, which beam is illuminating the target. As shown in FIG. 7, antennas 1 and 2 in a preferred form, may be simple pillbox antennas operating at X band having a wide aperture of many wave lengths so as to create the narrow portion of the beam. The transverse aperture is considerably smaller. As an example, the beam would be approximately 2°—3°wide along the narrow dimension and approximately 120°—150°wide in a horizontal dimension. Since X band is approximately 10 ghz, the dimensions would be approximately 3—4 feet in the long dimension and less than one inch in the narrow dimension. The two cross-beam antennas, since they are simple parabolic antennas, are thus relatively small and easy to fabricate at lost cost. The antennas are also preferably alternately switched in order to use a single radar transmitter (FIG. 3).

Figure 4:
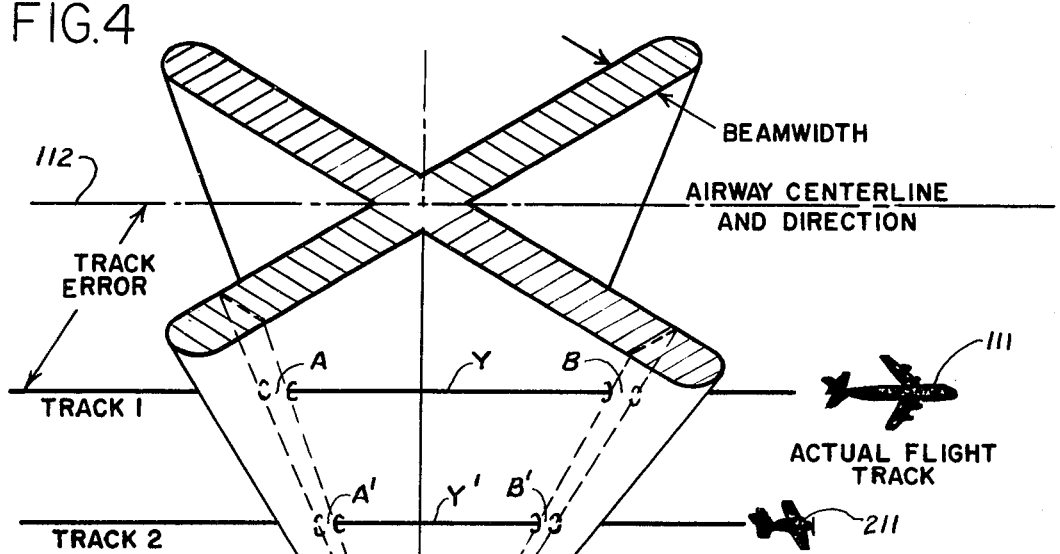
FIG. 4 is a diagrammatic representation illustrating the crossing of the intersecting means by two aircrafts at different elevations.
Figure 5:
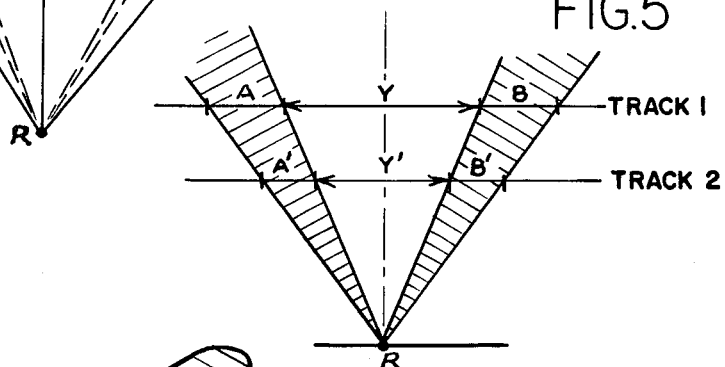
FIG. 5 is a mathematical schematic in diagrammatic form of the representation of FIG. 4.

FIGS. 4 and 5 disclose two aircraft tracks with cross-track errors with respect to vertical plane 112, but at different altitudes. For explanation purposes, assume that both aircraft 111 and 211 lie along intersecting plane RAB. The ratio of the beam width and the time duration between the two beams remains constant for both high and low tracks of aircraft 111 and 211 respectively. The radar will measure the slant range of each of the two aircraft, but the correction factor of the angle $a$ of intersecting area RAB away from vertical plane 112 will be used to determine the true vertical height of both aircraft.

The measurement of angle $a$ is independent of the actual radar slant range itself, even though this slant range measurement is utilized with angle $a$ to compute vertical height. By averaging the return radar pulses, beams A and B, as shown in detail in FIG. 5, which, for an X band radar amount to several hundred pulses, and therefore, truly representative of the beam width. Conventional circuitry is used in the radar to define the edges of the beam. Since the two beams are identical and are relatively closely spaced, it is a safe assumption that the intercepting track consists of a substantially straight flight. Thus, the ratio of Y/A or Y/B can be determined regardless of speed and height of the aircraft in order to establish the plane RAB which, in turn, creates the angle $a$ with respect to the vertical plane 112.

Figure 6:
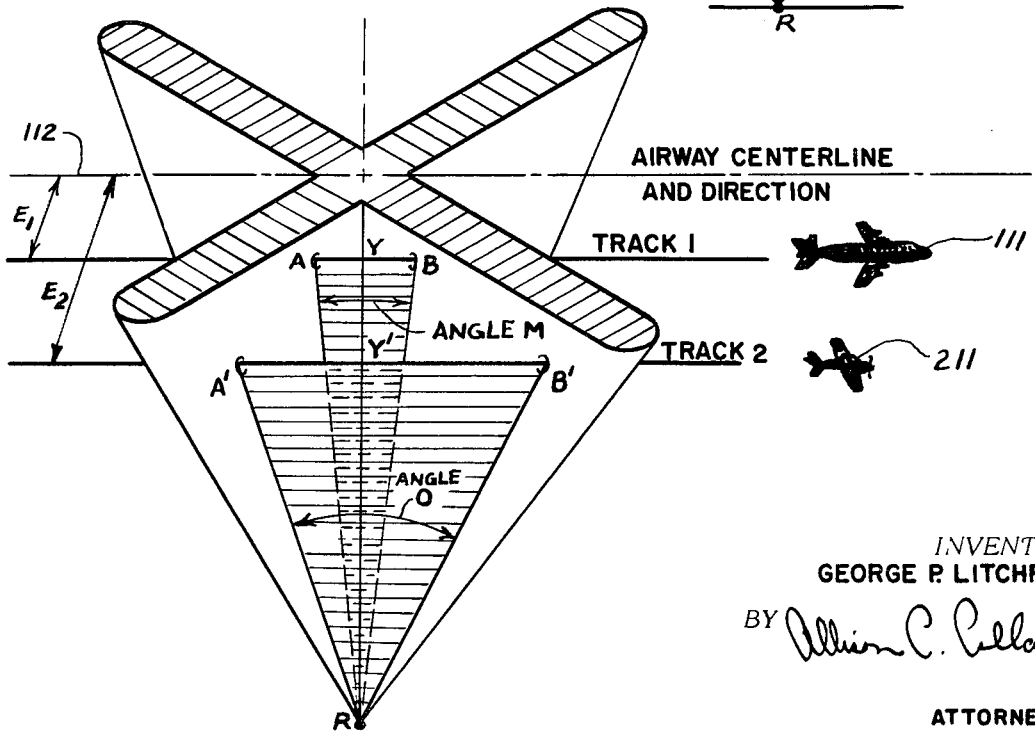
FIG. 6 is a diagrammatic representation of the crossing of the beams by two aircrafts having approximately the same altitude but different distances away from the center line of the crossed beams.

FIG. 6 shows another example of a variation in track error for two aircraft which cross the beam simultaneously, a rare occurrence. Range gating circuitry can readily separate the two height measurements to provide individually identified calibration data for each of aircraft 111 and 211. However, since the vertical planar beam of both antennas is relatively narrow, the probability of two aircrafts intercepting the beam simultaneously is extremely remote. In FIG. 6, aircraft 111 and 211 are at the same height but have different track errors $E_1$ and $E_2$, with respect to vertical plane 112. Aircraft 111 establishes plane RAB and aircraft 211 establishes plane R'A'B'. The departure angle between each of these planes and vertical plane 112 establishes angles $a$ and $a'$ respectively. Track angle M is formed by plane RAB and is equivalent to the simple radar measurement Y. Similarly, track angle O is established by the equivalent radar measurement of Y'.

As already mentioned, track errors $E_1$ and $E_2$ are directly related to Y and Y'.
Therefore:

Actual radar height $(H_a)$ = radar slant range $(COSa)$
or
$$H_a = H_r \cos a$$
$$H = K \cos \left[ \frac{Y}{\frac{1}{2}(A+B)} \right]$$

$K$ is a constant established by the beam width of the flat planar beam measured along the line parallel to the airway and intersecting the narrow dimension of the beams. The data processing takes place in simple pulse counting circuits that count the number of pulses received in each beam and the time interval between the averaged center of each beam's pulse returns.

The computation and processing of the data with respect to the subject invention is processed in the circuit according to FIG. 7. Antenna $A_1$ is connected through line 61 to contact 63, and antenna $A_2$ is connected through line 62 to contact 64. A microwave switch 3 synchronously switches movable contacts 65 between contacts 63 and 64 at a predetermined PRF. Microwave switch 3 can be a mechanical or an electronic switch capable of operating at high switching speeds. A typical PRF of 2,000 pulses per second is employed which, when divided between antennas 1 and 2, produce 1,000 pulses per second for each antenna. By using a PRF of 1,000 pulses per second and maintaining the individual pulses at a narrow pulse width such as one-tenth of one microsecond, it is possible to accurately measure the altitude of the aircraft since one-tenth of one microsecond is approximately 100 feet. The maximum altitude that can be determined before the next pulse arrives is approximately 30 miles. Obviously, no aircraft will be at an altitude of 30 miles using this facility. The output of magnetron transmitter 5 is connected to transmit receive switch 4 (TR switch) which, in turn, is connected to movable contacts 65. A stable oscillator 8, having a preferred frequency of 2,000 cycles per second, has one of its outputs coupled through line 66 to the input of PRF circuit 7. The output of PRF circuit 7 is coupled to modulator 6 which drives magnetron transmitter 5. The second output of oscillator 8 is connected through line 67 to pulse-producing circuit 68 which preferably consists of a multivibrator circuit for producing square pulses at 2,000 cycles per second. The output of pulse circuit 68 is coupled through line 69 to drive microwave switch 3. Radar receiver 10 is connected through line 70 to TR switch 4 for receiving radar pulse echos. When TR switch 4 is activated by the power from magnetron 5, receiver input 70 is blocked. However, as soon as the power of magnetron 5 is terminated, receiver 10 is immediately coupled to movable contact 65 to receive signals alternately from antennas 1 and 2. Circuit 16 measures the time in PRF count between the leading edge of the first beam which the aircraft intercepts to the final edge, when the aircraft departs from the second beam. This is shown as time $T_4 - T_1$ in FIG. 8. Track 112 represents the perfect track over the center lines of the beam. Track 35 is offset from center track 112 and requires a correction due to its slant range in order to determine the height of the aircraft. Beam 34 is the first beam to be intercepted, and beam 33 is the second beam to be intercepted. The output of counter 16 is coupled through conductor 26 to counter 25.

Receiver 10 includes a second output 17 which is switched synchronously with switch 3 and feeds counter 18. Counter 18 records the number of pulses that the ground radar will receive during the passage of the aircraft through beam 34. These pulses are the difference between the count at $T_2$ and $T_1$. In a similar manner, a third output of receiver 10 is coupled through line 19 to counter 20 in order to determine the pulse count representing the difference between time $T_4$ and $T_3$. The outputs of counters 18 and 20 are coupled to counter accumulator 22 in order to determine the sum of the time differences between $T_4$ and $T_3$, and, $T_2$ and $T_1$.

The output of accumulator circuit 22 is connected through line 71 to a division circuit 23 which averages the output of accumulator 22.

If the aircraft is at a higher altitude or a greater slant range, a greater number of pulses are counted. Accumulator 22 averages the pulses received from both beams. If track 35 is not exactly parallel to vertical plane 112, the accumulator, by dividing by two, corrects this error to an insignificant value.

The output 29 of divider 23 includes the average beam width pulse count so that it is possible to measure the transit time of the aircraft in the beam, and the number of pulses which are proportional to the ground velocity.

One output of this average pulse beam width is fed through line 27 to counter 25 so that the total time of travel between beams 33 and 34 is subtracted from the average beam width count so as to produce a pulse count 28 which represents the center-to-center beam measurement Z as shown in FIG. 8. Dimension Z between the median planes of the beams is coupled through line 77 into a normalizing circuit 67 which also receives the average beam width $W_A$ from line 78. The purpose of normalizing circuit 76 is to normalize the center-to-center beam measurement Z for any altitude of the aircraft. It is obvious that if the aircraft were to fly at the same angle $a$ at higher altitude on its second pass, the center-to-center measurement Z would be larger because of the divergence of the fan beams. Likewise, the beam width of each cross beam also becomes wider at higher altitudes. For example, the beam width of one fan beam will double if the altitude of the aircraft becomes doubled at the same angle from the zenith. Therefore, by dividing the center-to-center beam measurement Z by the average beam width $W_A$, it is possible to normalize measurement Z for any altitude of the aircraft passing through the beams. The slant range measurement could also be used to normalize the beam measurement Z.

The output of normalizing circuit 76 is fed into function generator 72 in order to generate at its output, cosine $a$, which is fed into multiplier 31. Dimension Z is directly proportional to angle $a$.

Another output of receiver 10 is fed into pulse-to-pulse range circuit 11 which measures the return time of the transmitted pulses for antennas 1 and 2. The output of range circuit 11 is fed into range averaging circuit 12 to provide the average slant range of the aircraft with respect to antennas 1 and 2. This average is connected through line 73 to another input of multiplier 31. The output 75 of multiplier 31 fed into indicator 32, thus produces the true vertical height of the aircraft over the ground. Another output of the average beam width in pulse count 29 is connected to computer 30, which also combines the slant range of the aircraft to produce, at indicator 126, the ground velocity of the aircraft.

Although the present invention utilizes only two beams crossed at a given angle, it is entirely within the scope of this invention to provide a radar having three intersecting beams spaced, for example, 60° with respect to each other. In the present invention, the cross-beam concept permits measurement of the true height of aircraft passing through the beams in any direction, as long as the two beams are intercepted during the crossing.

The antennas of the present invention are preferably located near a landing or departure area for aircraft in order to permit approaching aircraft to pass over the cross beams, and calibrate their barometric altimeters. The system of the present invention is capable of accuracies of a few feet for altitudes of approximately 10,000 feet. The system is particularly adapted for use at low altitudes where errors in altitude become critical. The true altitude information at the output of this system can be transmitted to the aircraft by voice, electronically and any other well known conventional method.

While only a few embodiments of the present invention have been shown and described, it will be obvious that many changes and modifications may be made thereunto without departing from the spirit and scope of the invention.

What is claimed is:

1. A system for determining the zenith angle of the line of flight of an aircraft over a reference location, comprising;
   first and second directive antennas, each having a fan-shaped directive pattern, located at the reference location and directed vertically upward, with their patterns intersecting in a region that extends vertically upward from the reference location,
   means for measuring and producing a representation of the time interval between the respective interceptions of the median planes of said directive patterns by the aircraft in its travel along said line of flight,
   means for measuring and producing a representation of the time interval during which the aircraft intercepts one of said beams,
   means for determining the quotient of said first interval representation divided by said second interval representation, and
   means for producing a representation of said quotient in terms of a specific function of said zenith angle.

2. The system as recited in claim 1 additionally comprising radar ranging means for determining slant range of the aircraft.

3. The system as recited in claim 2 additionally comprising computer means for combining the zenith angle and said slant range for determining the true height of the aircraft above the ground.

4. The system as recited in claim 1, wherein said means for measuring the said second time interval comprises a receiver coupled to one of said antennas, and means coupled to the output of the receiver for measuring the transit time of the aircraft in said beam.

* * * * *